(12) United States Patent
Wentland et al.

(10) Patent No.: US 7,703,956 B2
(45) Date of Patent: Apr. 27, 2010

(54) AIRCRAFT CABIN LIGHTING

(75) Inventors: Mark E. Wentland, Lynnwood, WA (US); Thomas L. LeBlanc, Mukilteo, WA (US); Charles K. Lau, Everett, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 11/833,871

(22) Filed: Aug. 3, 2007

(65) Prior Publication Data

US 2008/0266886 A1 Oct. 30, 2008

Related U.S. Application Data

(60) Provisional application No. 60/926,635, filed on Apr. 27, 2007.

(51) Int. Cl.
*F21V 7/00* (2006.01)
(52) U.S. Cl. .................. 362/470; 362/471; 362/472
(58) Field of Classification Search .......... 362/470–472
See application file for complete search history.

(56) References Cited

U.S. PATENT DOCUMENTS

| | | | | |
|---|---|---|---|---|
| 5,651,733 | A * | 7/1997 | Schumacher | 454/76 |
| 5,873,644 | A * | 2/1999 | Roessner et al. | 362/551 |
| 5,921,670 | A * | 7/1999 | Schumacher et al. | 362/480 |
| 6,874,919 | B2 * | 4/2005 | Stokes et al. | 362/471 |
| 6,896,388 | B2 * | 5/2005 | George et al. | 362/84 |
| 7,125,136 | B1 * | 10/2006 | Dedic et al. | 362/152 |
| 7,204,622 | B2 * | 4/2007 | Dowling et al. | 362/471 |
| 7,253,744 | B2 * | 8/2007 | Colacecchi | 340/686.1 |
| 7,336,195 | B2 * | 2/2008 | van de Ven | 340/815.45 |
| 2007/0035955 | A1 * | 2/2007 | Puschmann | 362/472 |
| 2007/0139941 | A1 * | 6/2007 | Bryan et al. | 362/470 |

* cited by examiner

*Primary Examiner*—Anabel M Ton
(74) *Attorney, Agent, or Firm*—Yee & Associates, P.C.; Charles S. Gumpel

(57) ABSTRACT

The incorporation of a variety of illumination sources to provide the additional light sources that reflect against a ceiling panel to provide an altered ceiling height effect in an aircraft. The incorporation of floor, aisle and door illumination provides the added benefit of facilitating emergency evacuation of the aircraft.

14 Claims, 6 Drawing Sheets

AIRCRAFT CABIN LIGHTING

CROSS-REFERENCE TO RELATED APPLICATIONS

This application claims priority to provisional application Ser. No. 60/926,635, filed on Apr. 27, 2007, the entire contents of which are hereby incorporated by reference.

BACKGROUND

1. Technical Field

The present disclosure relates generally to aircraft cabin lighting.

2. Description of Related Art

In general, the space in the passenger cabins of airplanes is limited. Therefore, there is a need in the aircraft industry for new and innovative solutions to passenger space limitations that provide all passengers with a feeling of utmost comfort.

SUMMARY

The present embodiments provide a lighting configuration and scheme that changes or varies the aesthetic appearance of passenger cabins in order to improve the perception of comfort within the space.

The embodiments provide the lighting configuration and scheme to the passenger cabin to enhance the key rituals performed aboard the aircraft, such as boarding, resting, eating, and the like according to various embodiments of the present disclosure.

The embodiments also provide a lighting configuration and scheme for use in an emergency evacuation processes for the aircraft according to various embodiments of the present disclosure.

In one aspect, the incorporation of a variety of illumination sources provides additional light sources that reflect against a ceiling panel to provide an altered ceiling height effect.

The incorporation of floor aisle illumination provides the added benefit of facilitating emergency evacuation of the aircraft.

Various embodiments of the present lighting configuration and scheme provide benefits, including without limitation: providing safe boarding and de-boarding; enhancing the ambience of the airplane interior for the increased pleasure of the passenger; and providing emergency lighting. Those of ordinary skill in the art will appreciate that some embodiments of the present disclosure may not provide all of the listed benefits.

Additional advantages, objects, and features of the present embodiments will be set forth in part in the detailed description that follows. It is to be understood that both the foregoing general description and the following detailed description merely provide examples, and are intended to provide an overview or framework for understanding the nature and character of the disclosure.

BRIEF DESCRIPTION OF THE DRAWINGS

Figure 1:
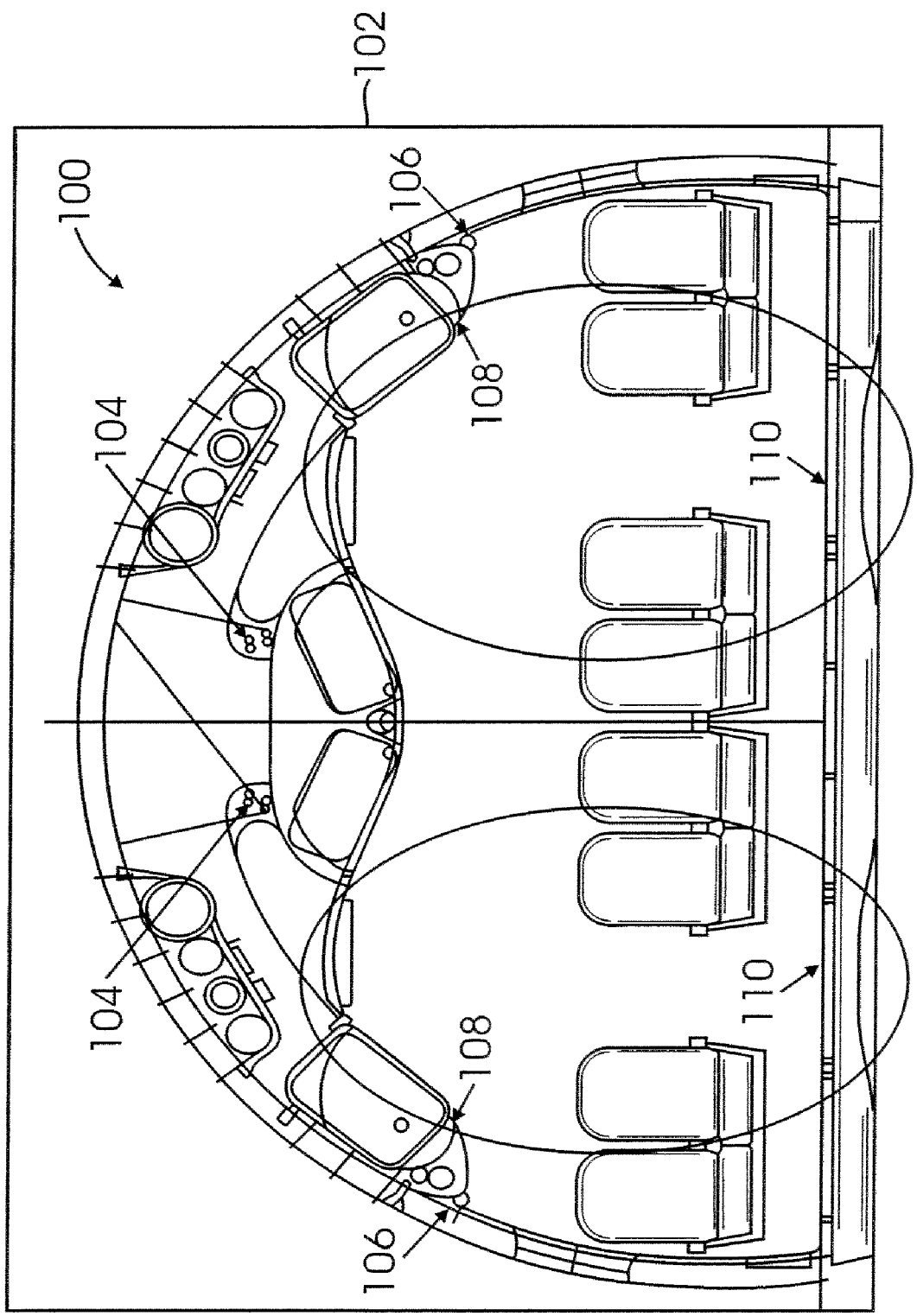
Figure 2:
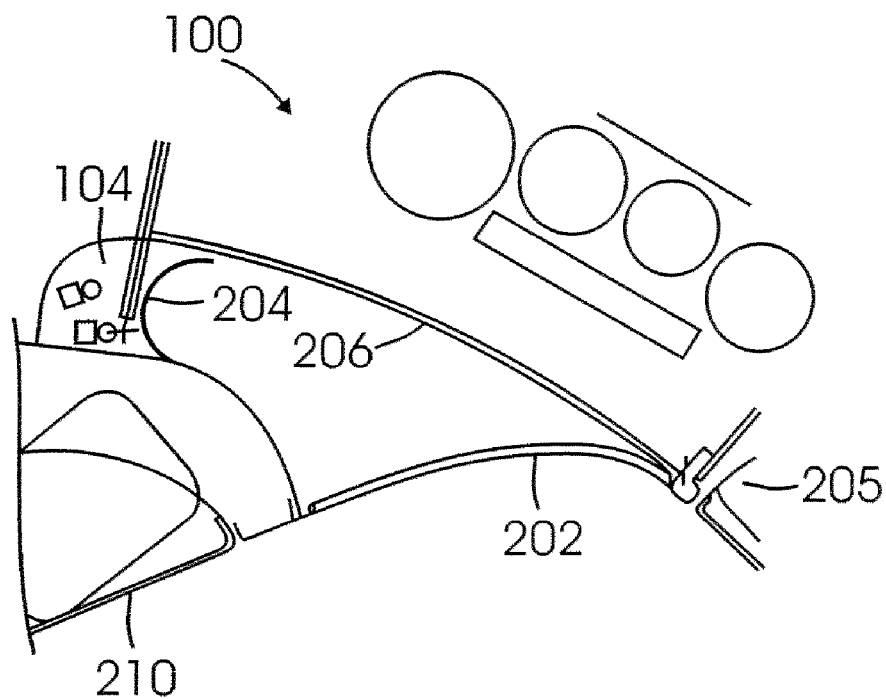
Figure 4:
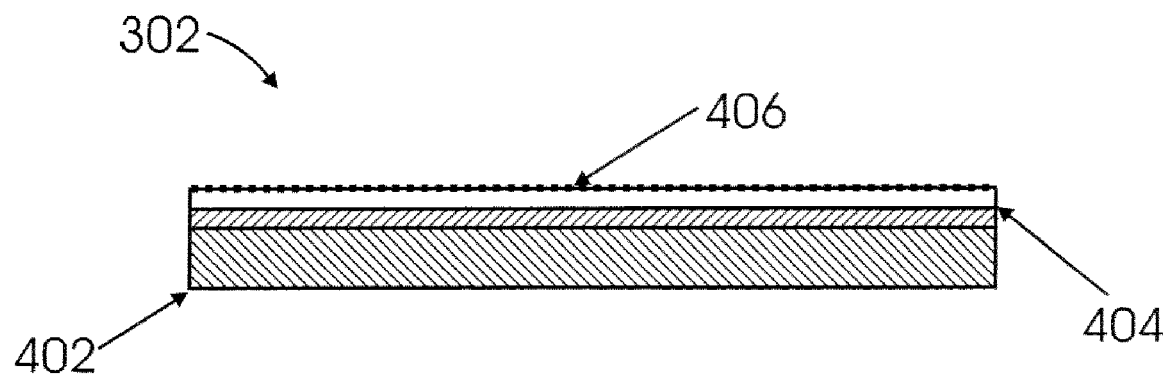
Figure 3:
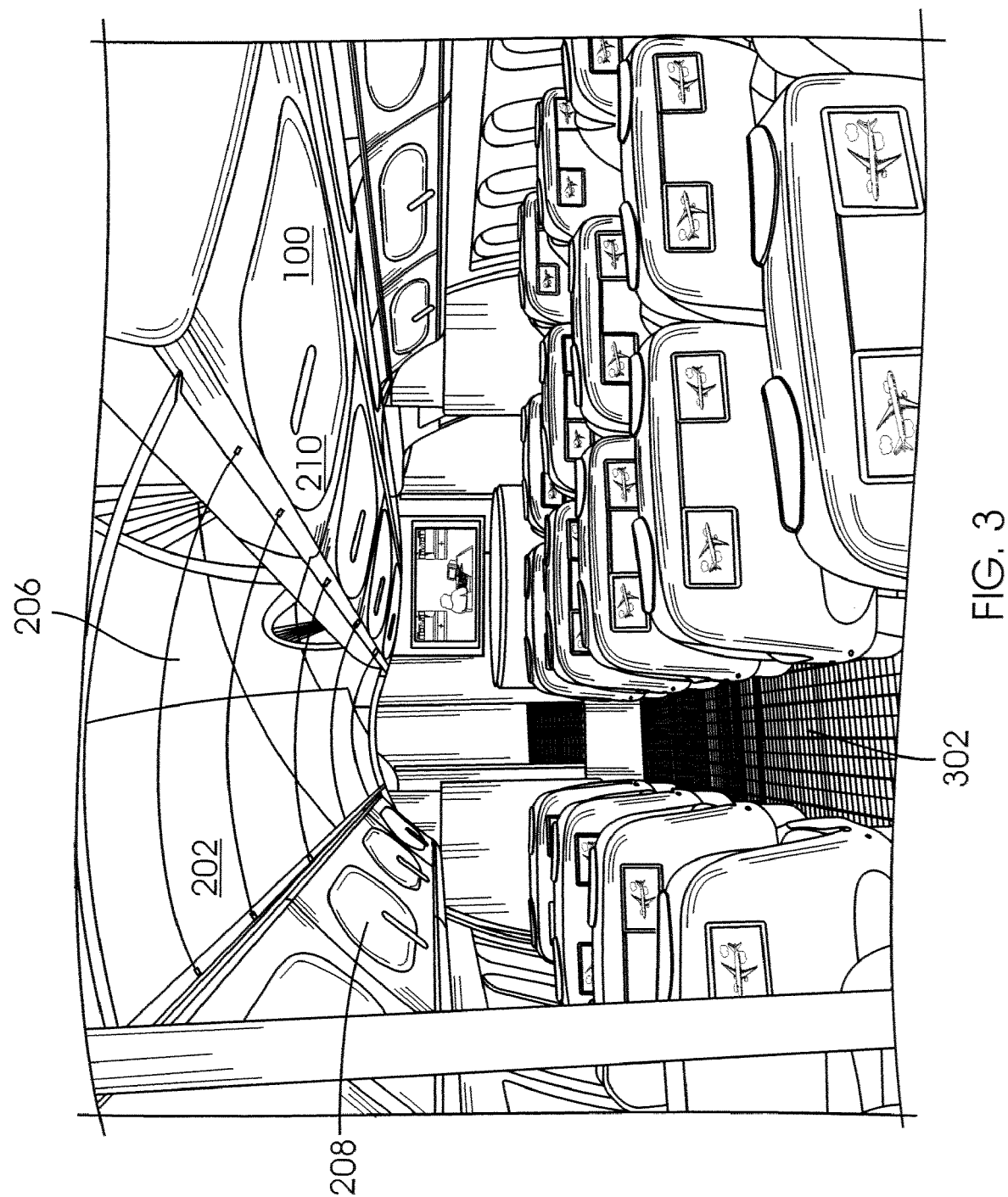
Figure 5:
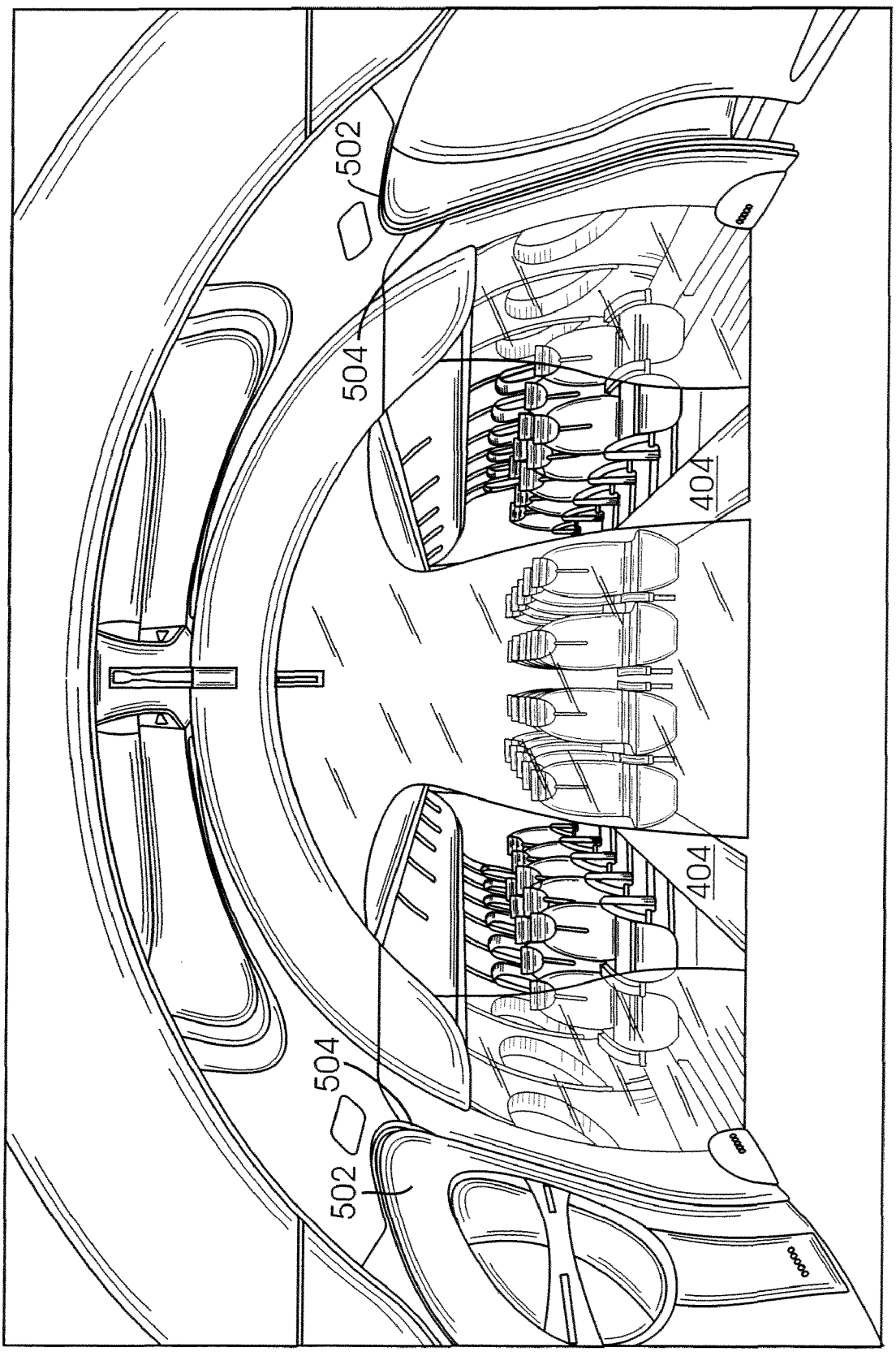
Figure 6A:
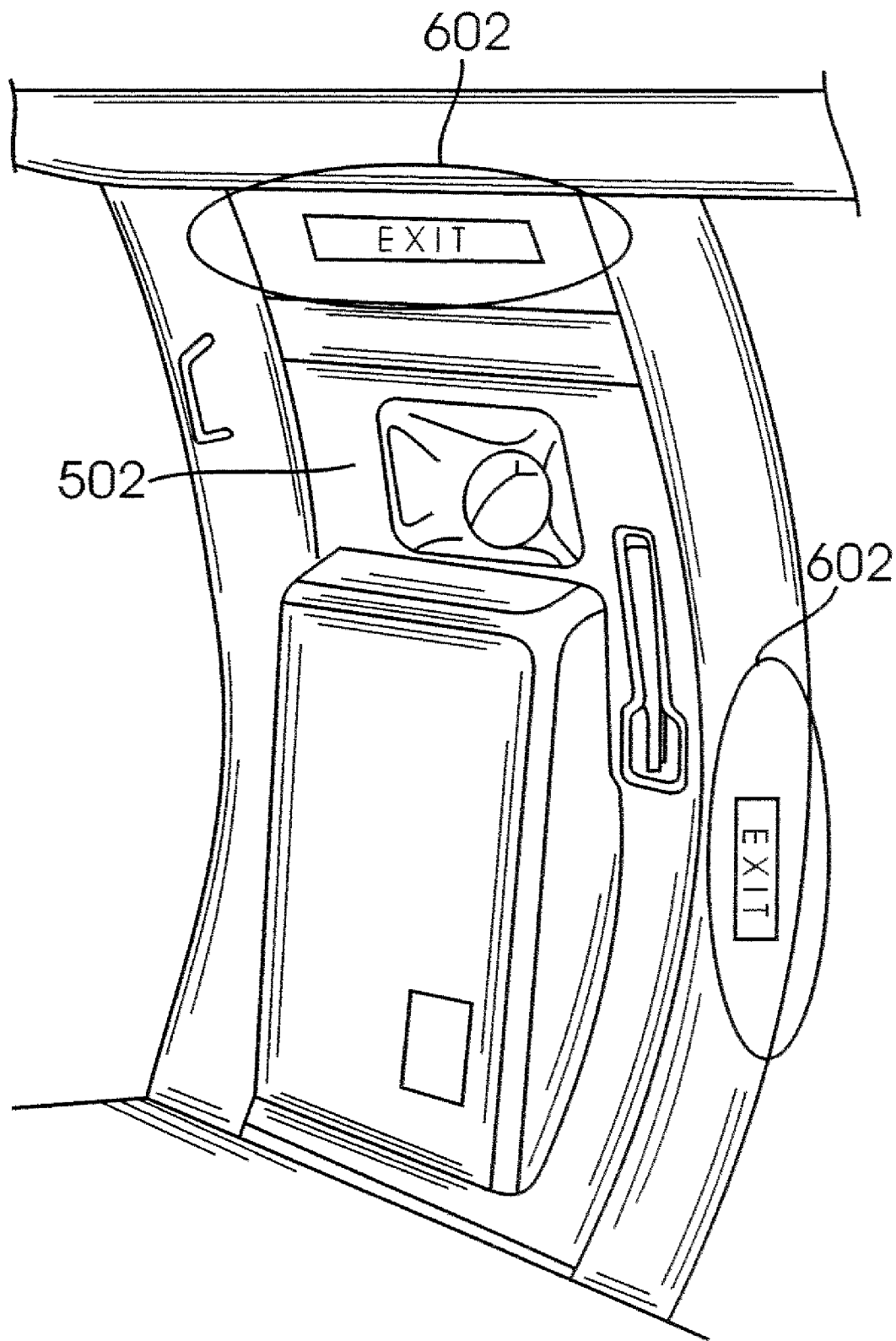
Figure 6B:
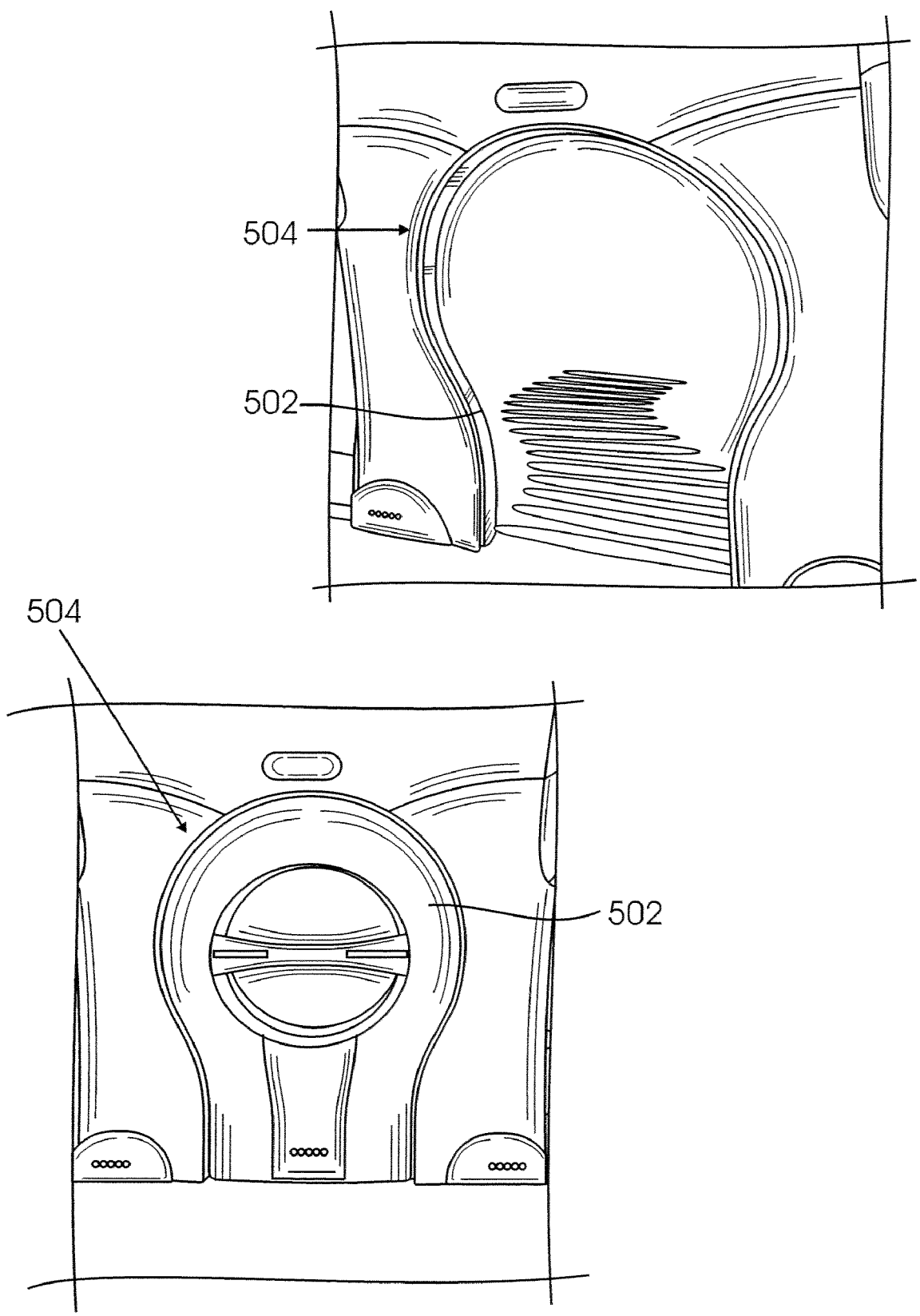

Having thus described the disclosure in general terms, reference will now be made to the accompanying drawings, which are not necessarily drawn to scale, and wherein:

FIG. 1 is a simplified cross sectional view of an aircraft interior showing a lighting scheme in accordance with an embodiment of the present disclosure;

FIG. 2 is a cross-sectional view showing a ceiling panel and light diffuser system in accordance with an embodiment of the present disclosure;

FIG. 3 is a rear perspective view of the aircraft interior of FIG. 1;

FIG. 4 is a simplified cross-sectional view of a floor assembly in accordance with an embodiment of the present disclosure;

FIG. 5 is a front perspective view of an aircraft interior incorporating embodiments of the present disclosure; and FIG. 6A is a front perspective view of an aircraft door; and FIG. 6B is a front perspective view and a front elevation view of another aircraft door.

DETAILED DESCRIPTION

The disclosure now will be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

FIG. 1 is a simplified cross sectional view of an aircraft interior 100 showing a lighting scheme and configuration in accordance with an embodiment of the present disclosure. In one embodiment, the lighting scheme and lighting configuration (hereinafter "lighting system 102") for aircraft interior 100 produces a two-tiered ceiling height effect by controlling the relative brightness levels of main ceiling lights 104, sidewall lighting 106, accent pot lights 108 and floor lights 110.

As shown in FIGS. 1, 2 and 3, in one embodiment the aircraft interior 100 includes ceiling panels and light diffusers. As shown in FIG. 2, ceiling panel member 202 is a light diffuser, and preferably is a separate piece of translucent material, which allows light to come through. In this embodiment, cabin light is provided by main ceiling lights 104, which act through light diffuser 204 before passing through panel diffuser 202. By changing the color and intensity of illumination from main ceiling lights 104, various degrees of brightness of the passenger cabin below panel diffuser 202 can be provided, which provide a desired impression to the passengers.

Panel diffuser 202 may include a lightweight frame structure with a bonded translucent or perforated material. In operation, panel diffuser 202 filters and reflects light. Depending on the intensity and location of the light sources, diffuser panel 202 can appear either translucent or opaque, thereby creating a change in the visual appearance of the height of standard ceiling panels 206, or at least a perception thereof.

Referring again to FIGS. 1 and 3, aircraft interior 100 includes floor assembly 302, provided in accordance with an embodiment of the present disclosure. As shown in FIG. 4, floor assembly 302 is composed of a structured floor panel 402, covered with an electroluminescent (EL) lighting panel 404 (hereinafter, "floor panel lights 404"), and covered with a textured protective covering 406. Floor panel lights 404 are available from BE Aerospace of Holbrook, N.Y. Textured protective covering 406 may be patterned and is available from 3 form, Inc. of Salt Lake City, Utah.

Floor panel lights 404 may contribute on the order of 20% of the total ambient illumination of aircraft interior 100. In one embodiment, floor panel lights 404 are configured to complement sidewall lighting 106 and main ceiling lighting 104. Sidewall lighting 106 may contribute about 30% of the total cabin ambient lighting, Main ceiling lighting 104 may provide around 50% of the main cabin lighting.

In operation, by controlling which illumination source is on (e.g. main ceiling lights 104, sidewall lighting 106, accent pot lights 108 and floor panel lights 404), and the reflection characteristics of panel diffuser 202, one can create a two-tiered ceiling effect. For example, when main ceiling lights 104 are bright for boarding and deplaning, panel diffuser 202 appears clear. Thus, standard ceiling panels 206 appear high and give the impression of spaciousness to aircraft interior 100.

When main ceiling lights 104 are turned down or off, the illumination provided by the remaining side panel lighting 106 and floor panel lights 404 reflect from panel diffuser 202, which then appears opaque, producing an illusion that ceiling 206 is lower, which is more comforting to the passenger for rest, relaxation and sleeping. In addition, ceiling 206 appears continuous with outboard and centerline stowage bins 208 and 210, respectively.

A further panel diffuser is found in United States Application No. 2006/0237585, Ser. No. 10/907,990, filed Apr. 22, 2005, entitled "Airplane Interior Systems" to Lau et al., which is herein incorporated by reference in its entirety for all purposes.

As illustrated in FIG. 5, floor panel lights 404 may be connected to emergency power systems and used as emergency lighting as part of an emergency evacuation processes for the aircraft. As shown, floor panel lights 404 may lead passengers down the aircraft aisle to aircraft doors 502.

Referring now to FIGS. 5, 6A and 6B, in addition to floor panel lights 404, additional emergency lighting may be used to highlight the location(s) of aircraft doors 502. Typically, aircraft doors 502 are labeled with EXIT signs 602 (FIG. 6A), which may be located at various locations on the door 502. It may happen, however, that during an emergency, the EXIT signs 602 may become blocked or obscured.

In one embodiment, as shown in FIGS. 5 and 6B, rope lights 504 may be connected to emergency power systems and used as emergency lighting as part of an emergency evacuation processes for the aircraft. Rope lights 504 may be used to encircle the outline of door 502. Thus, rope lights 504 reduce the possibility that aircraft door 502 may not be seen during an emergency. A suitable rope light 504 is available from Wiedamark, Inc. of Dallas, Tex.

It is to be understood that the present disclosure is not limited to the specific embodiments disclosed, and that modifications and other embodiments are intended to be included within the scope of the appended claims. Although specific terms are employed herein, they are used in a generic and descriptive sense only and not for purposes of limitation.

What is claimed is:

1. A lighting system for an aircraft interior to produce a tiered ceiling height effect comprising:
    a first illumination source;
    a second illumination source;
    at least one panel diffuser positioned between a ceiling of an aircraft and passenger seats disposed in the aircraft, wherein the second illumination source comprises a floor assembly including a floor panel covered with an electroluminescent (EL) lighting panel, wherein said EL lighting panel is connected to emergency power systems and provides emergency lighting as part of an emergency evacuation processes for the aircraft; and
    rope lights connected to said emergency power systems which encircle the outline of an aircraft door and provide emergency lighting as part of the emergency evacuation processes for the aircraft.

2. A lighting system for an aircraft interior to produce a tiered ceiling height effect comprising:
    a first illumination source positioned proximate the ceiling of an aircraft interior;
    a second illumination source positioned proximate the floor of the aircraft interior; and
    at least one panel diffuser positioned between said first illumination source and said second illumination source;
    said at least one panel diffuser appearing translucent when illuminated with a first combination of light intensity from said first and second illumination sources and said at least one panel diffuser appearing opaque when illuminated with a second combination of light intensity from said first and second illumination sources.

3. The lighting system of claim 2, wherein the first illumination source comprises a combination of ceiling lights, sidewall lights, and accent lights; and wherein the second illumination source comprises a combination of sidewall lights, and accent lights, and floor lights.

4. The lighting system of claim 2, wherein said second illumination source provides substantially zero light intensity to said first combination of light intensity and wherein said first illumination source provided substantially zero light intensity to said second combination of light intensity.

5. The lighting system of claim 4, wherein the light diffuser comprises a translucent material, which allows light to come through.

6. The lighting system of claim 2, further comprising a light intensity controller to control the color and intensity of illumination from the first and second illumination sources.

7. The lighting system of claim 2, wherein the second illumination source comprises a floor assembly including a floor panel with and electroluminescent (EL) lighting panel.

8. The lighting system of claim 7, wherein said EL lighting panel is connected to emergency power systems and provided emergency lighting as part of an emergency evacuation processes for the aircraft.

9. The lighting system of claim 8, further comprising rope lights connected to said emergency power systems which encircle the outline of an aircraft door and provide emergency lighting as part of the emergency evacuation processes for the aircraft.

10. A lighting system for an aircraft interior to produce a tiered ceiling height effect comprising:
    a first illumination source;
    a second illumination source;
    a light intensity controller to control the color and intensity of illumination from the first and second illumination sources; and
    at least one panel diffuser positioned between a ceiling of an aircraft and passenger seats disposed in the aircraft, wherein said at least one panel diffuser appears translucent when illuminated by a first combination of light from said first and second illumination sources and wherein said at least one panel diffuser appears opaque when illuminated by a second combination of light from said first and second illumination sources.

11. A lighting system for an aircraft interior to produce a tiered ceiling height effect comprising:
    a first illumination source;
    a second illumination source;
    a light intensity controller to control the color and intensity of illumination from the first and second illumination sources; and
    at least one panel diffuser positioned between a ceiling of an aircraft and passenger seats disposed in the aircraft, wherein the first illumination source comprises a combination of main ceiling lights, sidewall lights, and accent pot lights; and wherein the second illumination source comprises a combination of sidewall lights, and accent pot lights, and floor lights.

12. A lighting system for an aircraft interior to produce a tiered ceiling height effect comprising:

a first illumination source;

a second illumination source; and at least one panel diffuser positioned between a ceiling of an aircraft and passenger seats disposed in the aircraft, wherein the second illumination source comprises a floor assembly including a floor panel covered with an electroluminescent (EL) lighting panel, wherein said at least one panel diffuser appears translucent when illuminated by a first combination of light from said first and second illumination sources and wherein said at least one panel diffuser appears opaque when illuminated by a second combination of light from said first and second illumination sources.

13. A lighting system for an aircraft interior to produce a tiered ceiling height effect comprising:

a first illumination source;

a second illumination source; and at least one panel diffuser positioned between a ceiling of an aircraft and passenger seats disposed in the aircraft, wherein the first illumination source comprises a ceiling light; and wherein the second illumination source comprises a floor light, and wherein said at least one panel diffuser appears translucent when illuminated by a first combination of light from said first and second illumination sources and wherein said at least one panel diffuser appears opaque when illuminated by a second combination of light from said first and second illumination sources.

14. A lighting system for an aircraft interior to produce a tiered ceiling height effect comprising:

a first illumination source;

a second illumination source; and at least one panel diffuser positioned between a ceiling of an aircraft and passenger seats disposed in the aircraft, wherein the first illumination source comprises a combination of ceiling light, sidewall lights and accent pot light; and wherein the second illumination source comprises a combination of floor light, sidewall lights and accent pot lights.

* * * * *